United States Patent [19]

Smart

[11] Patent Number: 4,994,828
[45] Date of Patent: Feb. 19, 1991

[54] CAMERA APPARATUS FOR PREVENTING LOAD OF EXPOSED FILM

[75] Inventor: David C. Smart, Rochester, N.Y.
[73] Assignee: Eastman Kodak Company, Rochester, N.Y.
[21] Appl. No.: 436,265
[22] Filed: Nov. 14, 1989
[51] Int. Cl.⁵ .............................................. G03B 7/00
[52] U.S. Cl. ..................................... 354/21; 354/275
[58] Field of Search ................ 354/21, 288, 275, 212, 354/213, 214; 242/71.1

[56] References Cited

U.S. PATENT DOCUMENTS

| | | | |
|---|---|---|---|
| 4,310,233 | 1/1982 | Okuyama et al. | 354/212 |
| 4,401,379 | 8/1983 | Tamamura et al. | 354/214 |
| 4,423,943 | 1/1984 | Gold | 354/275 |
| 4,834,306 | 5/1989 | Robertson | 242/71.1 |
| 4,846,418 | 7/1989 | Fairman | 242/71.1 |
| 4,947,197 | 8/1990 | Smart | 354/214 |
| 4,965,600 | 10/1990 | Smart et al. | 354/212 |

Primary Examiner—L. T. Hix
Assistant Examiner—Khanh Dang
Attorney, Agent, or Firm—Roger A. Fields

[57] ABSTRACT

In a camera to be used with a light-tight cassette which in inherently capable of automatically advancing a filmstrip from the cassette shell whether the filmstrip is generally unexposed, partly exposed or substantially completely exposed, and which has a status indicator for providing a visible indication of the exposure status of the filmstrip, a sensing/blocking member is included to cooperate with the status indicator to prevent cassette loading into the camera in one embodiment only when the status indicator indicates that the filmstrip is completely exposed and in another embodiment either when the status indicator indicates that the filmstrip is partly exposed or it indicates that the filmstrip is completely exposed.

16 Claims, 16 Drawing Sheets

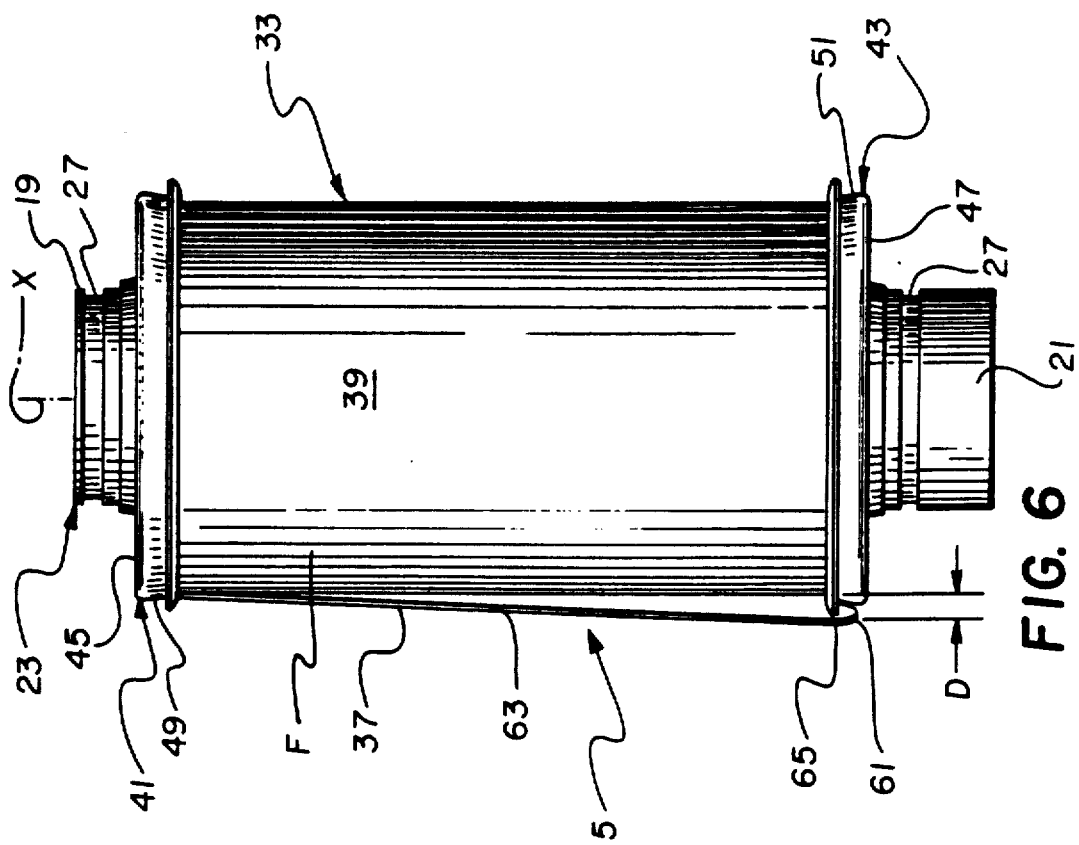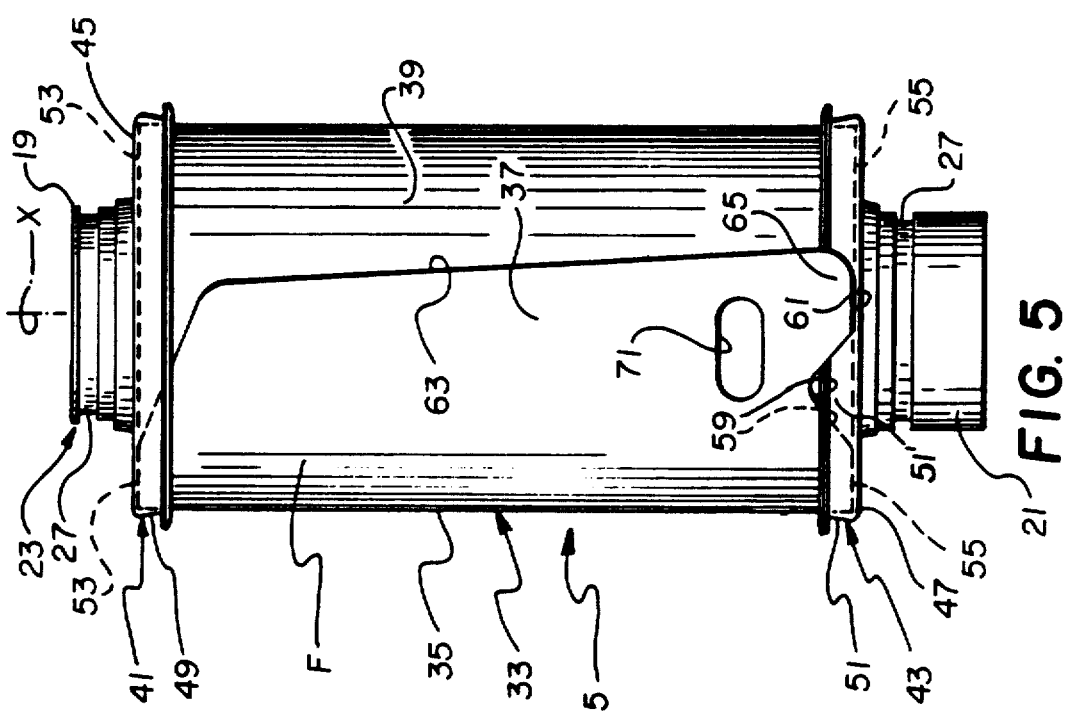

CAMERA APPARATUS FOR PREVENTING LOAD OF EXPOSED FILM

CROSS-REFERENCE TO RELATED APPLICATION(S)

Reference is made to commonly assigned copending applications Ser. No. 390,931, now U.S. Pat. No. 4,965,600 entitled CAMERA FOR USE WITH FILM CASSETTE HAVING FILM-EXPOSURE STATUS INDICATOR, and filed Aug. 8, 1989 in the names of David C. Smart and Dennis E. Baxter, Ser. No. 407,170, now U.S. Pat. No. 4,947,197 entitled SIMPLE CAMERA FOR USE WITH FILM CASSETTE HAVING FILM-EXPOSURE STATUS INDICATOR, and filed Sept. 14, 1989 in the names of David C. Smart and Dennis E. Baxter, and Ser. No. 436,266 entitled FILM CASSETTE WITH EXPOSURE STATUS INDICATOR, and filed Nov. 14, 1989 in the name of David C. Smart.

The forgoing applications cross-referenced above are incorporated (by reference) in this application.

BACKGROUND OF THE INVENTION

1. Field of the Invention

The invention relates generally to the field of photography, and particularly to cameras. More specifically, the invention relates to still-picture camera apparatus for preventing load of exposed film.

2. Description of the Prior Art

In conventional 35 mm film manufacturers' cassettes, such as manufactured by Eastman Kodak Co. and Fuji Photo Film Co. Ltd., the filmstrip is wound on a flanged spool which is rotatably supported within a cylindrical shell. A leading or forwardmost portion of the filmstrip approximately 2½ inches long, commonly referred to as a "film leader", normally protrudes from a light-trapped slit or mouth of the cassette shell. One end of the spool has a short axial extension which projects from the shell, enabling the spool to be turned by hand. If the spool is manually rotated in an unwinding direction, the film roll inside the shell will tend to expand radially since the inner end of the filmstrip is attached to the spool, and the fogged leader portion protruding from the slit will remain stationary. The film roll can expand radially until a non-slipping relation is established between its outermost convolution and the inner curved wall of the shell. Once this nonslipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader portion to draw the filmstrip out of the shell.

A 35 mm film cassette has been proposed which, unlike conventional film cassettes, can be operated to automatically advance the filmstrip out of the cassette shell by rotating the film spool in the unwinding direction. Moreover, the film leader is non-protruding, i.e. it is located entirely within the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner wall of the cassette shell. The trailing end of the filmstrip is secured to the film spool, and the forward or leading end of the filmstrip is slightly tapered to allow it to freely extend from between the circumferential lips and rest against the shell wall. During unwinding rotation of the film spool, the leading end of the filmstrip is advanced to and through a film passageway opening in order to exit the cassette shell. As a result, all that is needed to advance the filmstrip out of the cassette shell is to rotate the film spool in the unwinding direction. However, according to U.S. Pat. No. 4,423,943, the film cassette is intended to be loaded in a camera only after the non-protruding leader is advanced to the outside of the cassette shell. In the patent, it is suggested that one manually rotate the film spool relative to the cassette shell until the film leader can be manually grasped and attached to a film advancing device in the camera. Thus, the camera is not used to rotate the film spool to advance the filmstrip from the cassette shell.

More recently, in U.S. Pat. No. 4,834,306, granted May 30, 1989 and in U.S. Pat. No. 4,846,418, granted July 11, 1989, there are disclosed other film cassettes wherein a non-protruding leader is advanced automatically to the outside of the cassette shell responsive to rotation of the film spool in an unwinding direction. In those patents, as compared to U.S. Pat. No. 4,423,943, however, there is no suggestion to manually rotate the film spool to expel the film leader.

In conventional 35 mm film manufacturers' cassettes, after the filmstrip is completely exposed, the film spool is rotated in a winding direction to rewind the film leader into the cassette shell. Since the film leader cannot subsequently be advanced out of the cassette shell (because of the binding effect between the film roll and the shell), this usually serves as an indication that the filmstrip is completely exposed. Conversely, in the film cassettes disclosed in U.S. Pat. Nos. 4,423,943, 4,834,306, and 4,846,418, the film leader can be automatically advanced out of the cassette shell by rotating the film spool in the unwinding direction. This can be done regardless of whether the filmstrip is unexposed, completely exposed, or only partly exposed. Thus, the film cassettes provide no indication as to the exposure status of the filmstrip.

THE CROSS-REFERENCED APPLICATIONS

Cross-reference applications Ser. Nos. 390,931 and 407,170 now U.S. Pat. Nos. 4,965,600 and 4,947,197 disclose different type cameras for use with a film cassette which is inherently capable of automatically advancing a filmstrip from the cassette shell whether the filmstrip is generally unexposed, only partly exposed or substantially completely exposed. The film cassette has a film-exposure status indicator movable from an unexposed position for providing a visible indication that the filmstrip is generally unexposed, to a partly exposed position for providing a visible indication that the filmstrip is partly exposed, and to an exposed position for providing a visible indication that exposure of the filmstrip is completed. Since the camera disclosed in cross-referenced application Ser. No. 390,931 is capable of returning the filmstrip to the cassette shell prematurely when the filmstrip is only partly exposed and of advancing the filmstrip from the cassette subsequently to complete its exposure, it includes control means that operates drive means to move the status indicator from the unexposed position to the partly exposed position in the event the filmstrip returned to the cassette shell is partly exposed and to move the status indicator from either the unexposed or partly exposed position to the exposed position in the event the filmstrip returned to the cassette shell is substantially completely exposed. Since the camera disclosed in cross-referenced application Ser. No. 407,170 now U.S. Pat. No. 4,947,197 is intended to only receive a film cassette containing generally unexposed film (as opposed to partly exposed film), it is adapted to move the status indicator from the unexposed position to the exposed position without stopping at the partly exposed position. However, neither of the cameras disclosed in the cross-referenced applications includes any means that would prohibit receipt of the film cassette under certain exposure conditions such as when the status indicator is in its exposed position.

Cross-referenced application Ser. No. 436,266 discloses a film cassette inherently capable of advancing a filmstrip automatically from a light-tight cassette shell whether the filmstrip is generally unexposed, partly exposed or substantially completely exposed, wherein a film-exposure status indicator can be disposed in any one of three corresponding positions comprising unexposed, partly exposed and exposed positions. The status indicator includes a physical discontinuity which occupies first and second partly in-common areas when the status indicator is in its unexposed and partly exposed positions, respectively, to allow the discontinuity to be identically sensed at the same location within an in-common portion of the first and second areas regardless of whether the status indicator is in the unexposed or partly exposed position and, alternately, to allow the discontinuity to be sensed at another location within a particular portion of the first area not in-common with the second area only when the status indicator is in the unexposed position, and which occupies a third area when the status indicator is in its exposed position that does not extend to either one of the locations to prevent the discontinuity from beng sensed at each one of the locations when the status indicator is at the unexposed position.

SUMMARY OF THE INVENTION

According to the invention, there is provided apparatus for preventing the loading of exposed film in a camera. More specifically, in a camera to be used with a light-tight cassette which is inherently capable of automatically advancing a filmstrip from the cassette shell whether the filmstrip is generally unexposed, partly exposed or substantially completely exposed, and which has a status indicator for providing a visible indication of the exposure status of the filmstrip, a sensing/blocking member is included to cooperate with the status indicator to prevent cassette loading into the camera in one embodiment only when the status indicator indicates that the filmstrip is completely exposed and in another embodiment either when the status indicator indicates that the filmstrip is partly exposed or it indicates that the filmstrip is completely exposed.

BRIEF DESCRIPTION OF THE DRAWINGS

FIGS. 5 and 6 are elevation views of the film roll and the film spool, illustrating the manner in which the film roll is stored on the film spool;

DETAILED DESCRIPTION OF THE PREFERRED EMBODIMENT

The invention is disclosed as being embodied preferably in a 35 mm still camera. Because the features of this type of camera are generally well known, the description which follows is directed in particular to elements forming part of or cooperating directly with the disclosed embodiment. It is to be understood, however, that other elements not specifically shown or described may take various forms known to persons of ordinary skill in the art.

The Film Cassette

Figure 1:
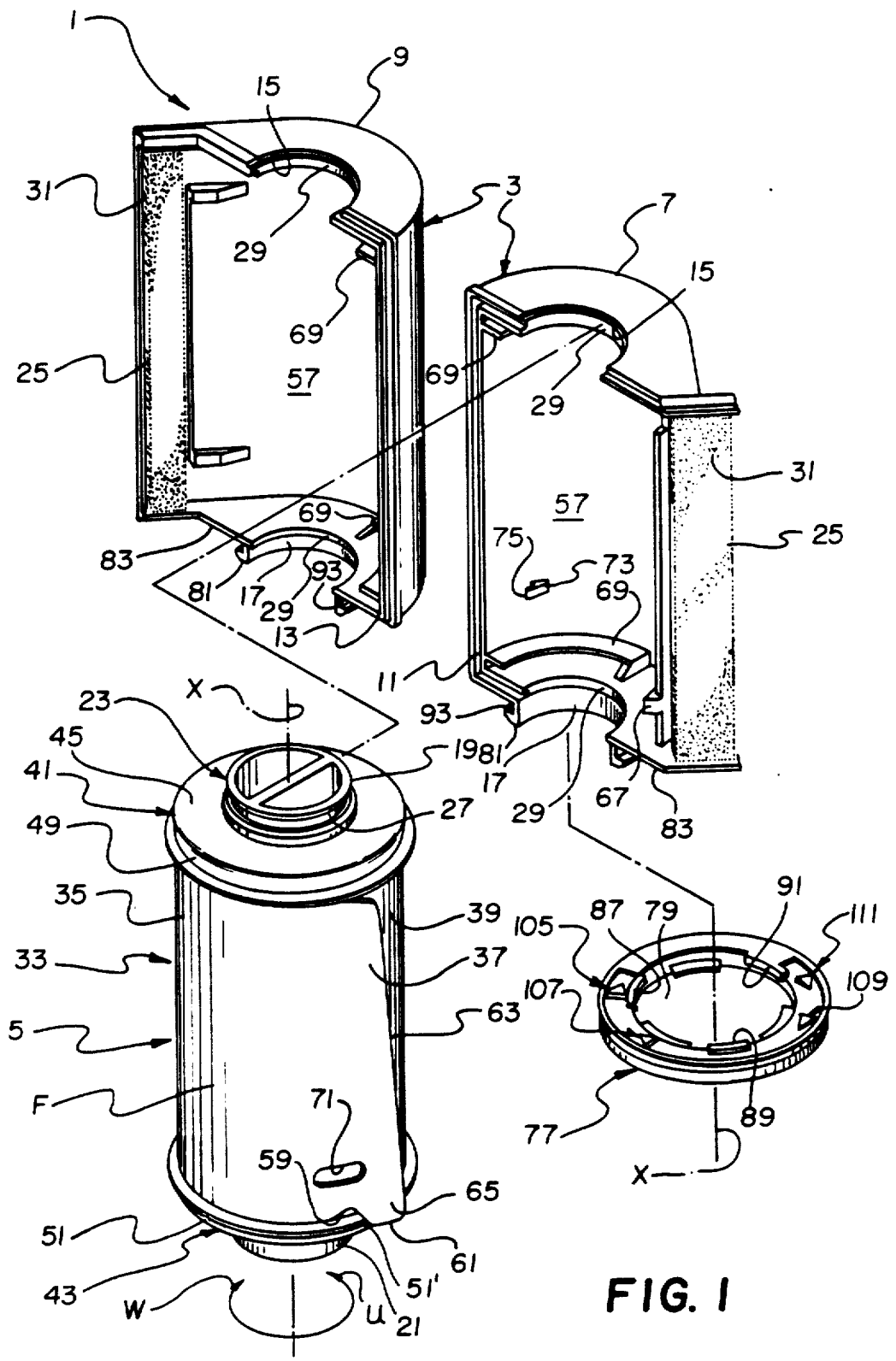
FIG. 1 is an exploded perspective view of a film cassette having a film-exposure status indicator as disclosed in cross-referenced applications Ser. No. 390,931, Ser. No. 407,170 and Ser. No. 436,266.
Figure 2:
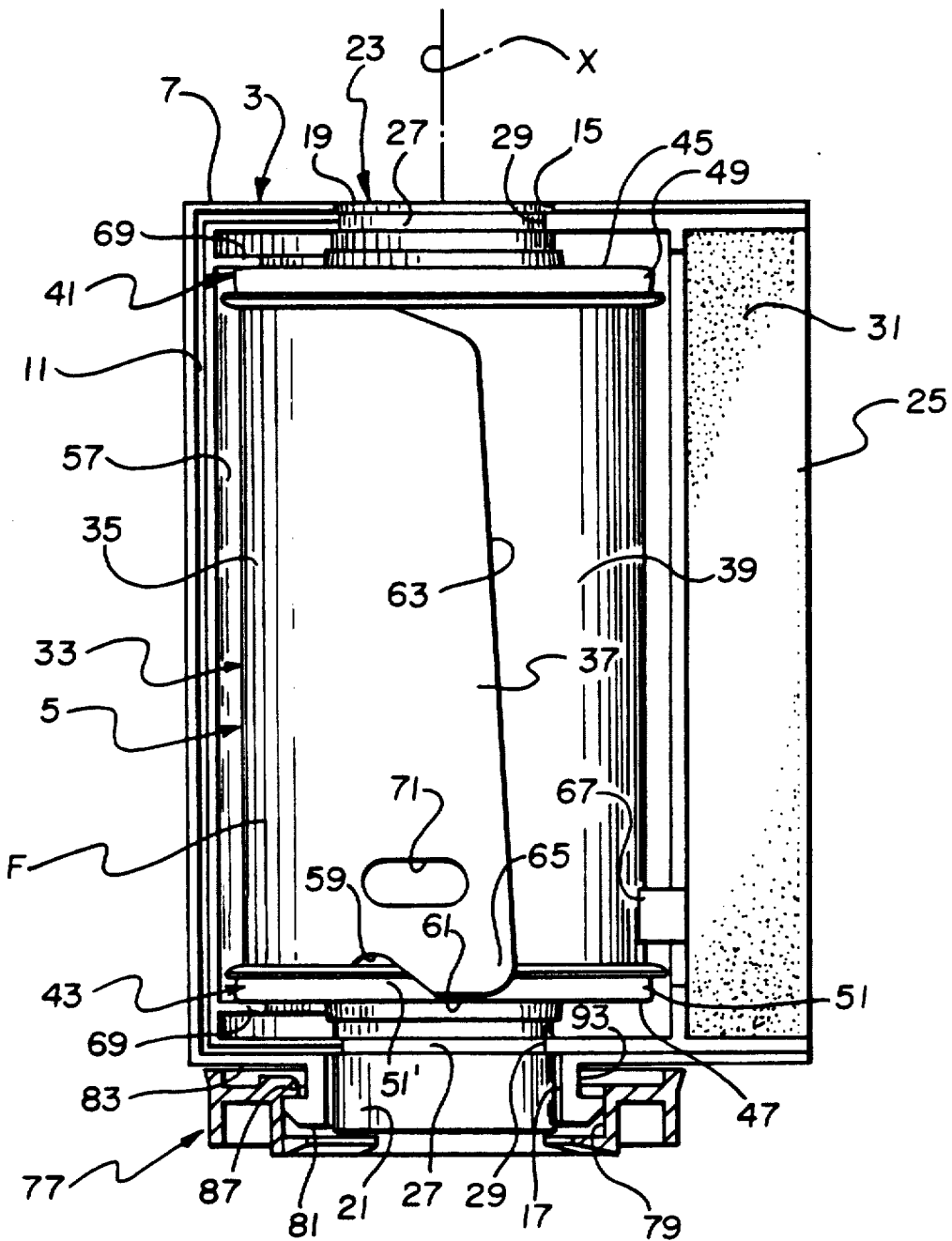
FIG. 2 is an elevation view of the film cassette, illustrating the cassette shell open to reveal a film roll coiled about a film spool.

Referring now to the drawings, FIGS. 1 and 2 depict a 35 mm film cassette 1 comprising a light-tight cassette shell 3 and a film spool 5 which is rotatable about an axis X in film unwinding and winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for relatively shorter and longer opposite end extensions 19 and 21 of a spool core or hub 23, and they define a film passageway 25 to the exterior of the cassette shell 3. The longer and shorter end extensions 19 and 21 of the spool core 23 each include an annular groove 27 which mates with a corresponding edge 29 of the respective openings 15 and 17 to rotatably support the film spool 5 for rotation about the axis X in the film unwinding and winding directions U and W. A known black velvet or plush material 31 lines the interior of the film passageway 25 to prevent ambient light from entering the film passageway.

Figure 3:
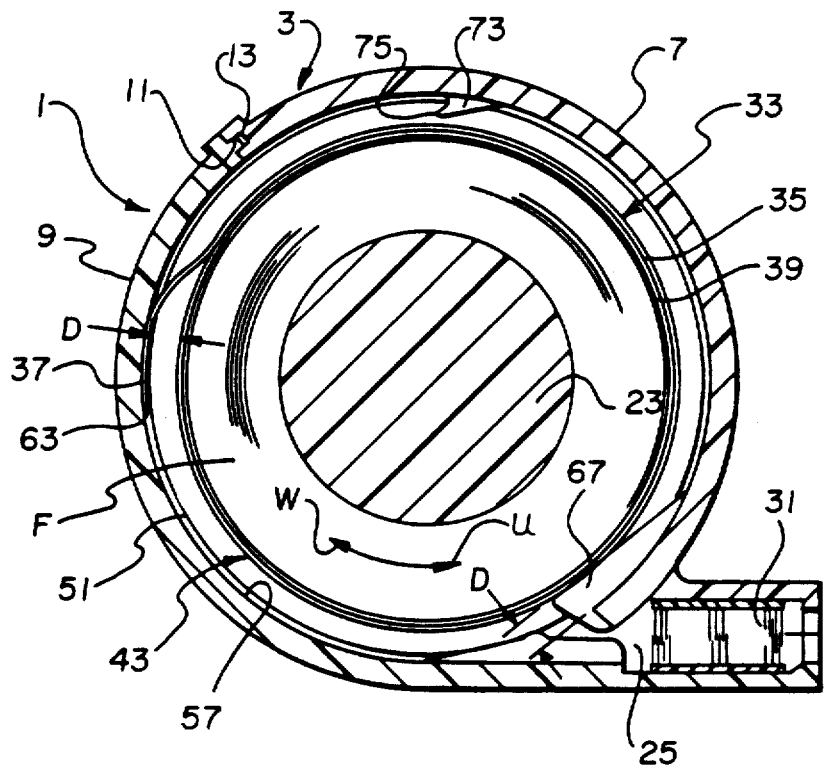
FIGS. 3 and 4 are end views is cross-section of the cassette shell, the film roll, and the film spool.

A roll 33 of 35 mm filmstrip F is coiled about the spool core 23 to form successive film convolutions. As shown in FIG. 3, the film roll 33 includes an outermost convolution 35 which is a film leader having a leading or forward end 37, and it includes a next-inward convolution 39 coiled behind the outermost convolution. The inner or trailing end of an innermost convolution, not shown, of the film roll 33 is secured to the spool core 23.

A pair of upper and lower identical, very thin, flexible film constraining flanges 41 and 43 are coaxially spaced along the spool core 23 as shown in FIGS. 1, 2, and 5. The two flanges 41 and 43 comprise respective integral disks 45 and 47 and respective integral annular lips or skirts 49 and 51 which circumferentially extend from the disks. The two disks 45 and 47 cover opposite flat sides, not shown, of the film roll 33 which are defined by corresponding opposite longitudinal edges 53 and 55 of each successive convolution of the film roll, and they have respective central holes, not shown, through which the spool core 23 axially extends to permit rotation of the spool core relative to the flanges 41 and 43. See FIG. 5. The annular lips 49 and 51 overlap the outermost convolution (film leader) 35 of the film roll 33 radially outwardly of the respective longitudinal edges 53 and 55 of that convolution to radially confine the convolution to thus prevent it from radially expanding or clock-springing into substantial contact with an interior curved wall 57 of the cassette shell 3. A lip-receiving notch 59 is cut in the outermost convolution (film leader) 35 along its longitudinal edge 55, relatively close to its leading end 37, to receive a peripheral section 51' of the annular lip 51. This allows a relatively short edge-section 61 of the outermost convolution (film leader) 35 connecting the leading end 37 and the notch 59 to overlap the annular lip 51 radially outwardly to thus maintain the leading end spaced a radial distance D from the next-inward convolution 39 of the film roll 33. See FIGS. 3 and 6. The leading end 37 has a forward edge 63 inclined from the longitudinal edge 53 of the outermost convolution 35 to the other longitudinal edge 55 of that convolution to form a forwardmost tip or tab 65 of the convolution which, like the edge-section 61, overlaps the annular lip 51 radially outwardly. See FIG. 5.

A film stripper-guide 67 formed with the cassette half 7 is positioned immediately inward of the inner entry to the film passageway 25 to be received between the leading end 37 of the outermost convolution (film leader) 35 and the next-inward convolution 39, to pick up the leading end and guide it into the film passageway 25 responsive to rotation of the film spool 5 in the unwinding direction U. The leading end 37 will be advanced over the stripper-guide 67 and into the film passageway 25, rather than between the stripper-guide and the next-inward convolution 39, because it is spaced the radial distance D from the latter convolution. Thus, as shown in FIG. 3, the leading end 37 will be located within range of the stripper-guide 67 due to such spacing from the next-inward convolution 39.

Figure 8:
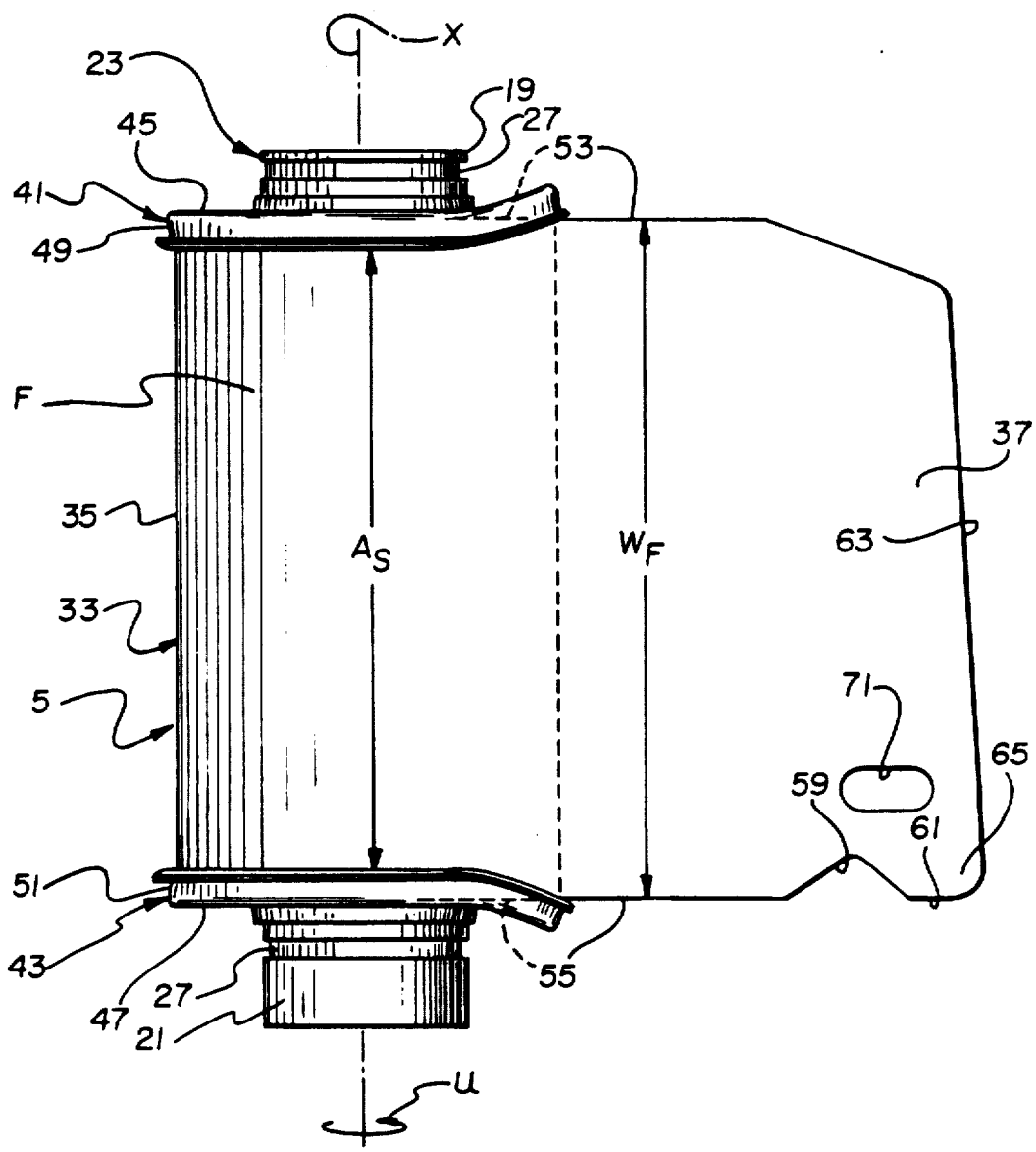

When the leading end 37 of the outermost convolution (film leader) 35 is advanced over the stripper-guide 67 responsive to rotation of the film spool 5 in the unwinding direction U, the longitudinal edges 53 and 55 of that convolution start to gently flex respective arcuate portions of the two flanges 41 and 43 axially away from one another as shown in FIG. 8, first to allow the notch 59 to separate from the lip section 51', and then to allow successive longitudinal sections of the film roll 33 (beginning with the leading end) to exit from between the flanges to the outside of the cassette shell 3. The local flexing of the flanges 41 and 43 occurs because the film width $W_F$ between the longitudinal edges 53 and 55 is slightly greater than the axial spacing $A_S$ between the annular lips 49 and 51. Moreover, successive convolutions of the film roll 33 have a resistance to transverse bowing that is greater than the resistance of the flanges 41 and 43 to be locally flexed. A pair of flat curved bearing members 69 extend from the interior wall 57 of the cassette shell 3 to lie flatly against successive arcuate portions of the two disks 45 and 47 as the flanges 41 and 43 are locally flexed axially away from one another, to thereby return the flexed portions of the flanges to their normal original non-flexed condition.

Figure 4:
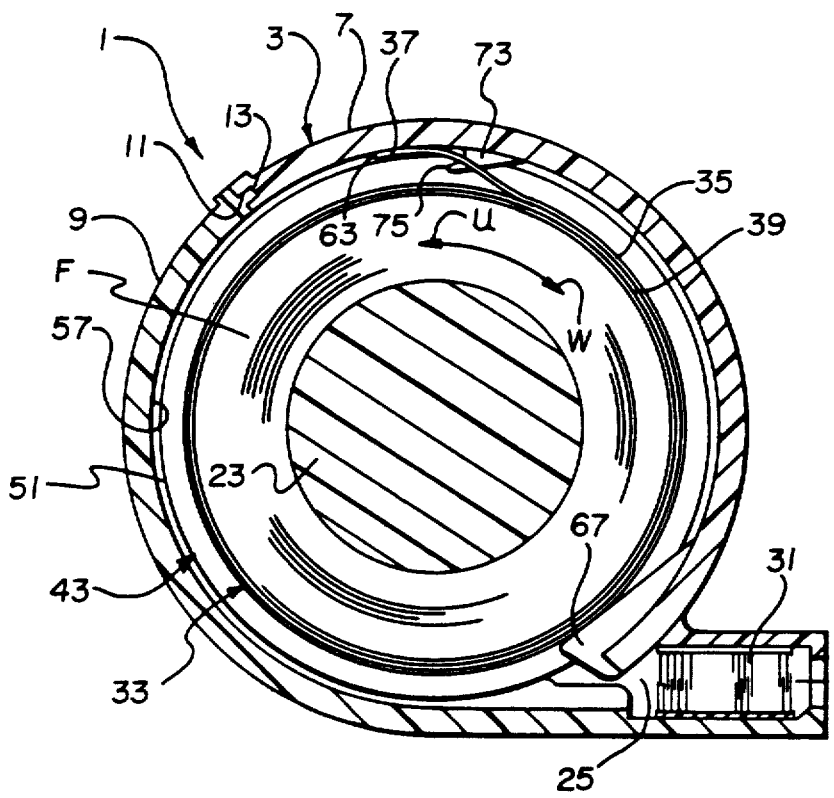
Figure 7:
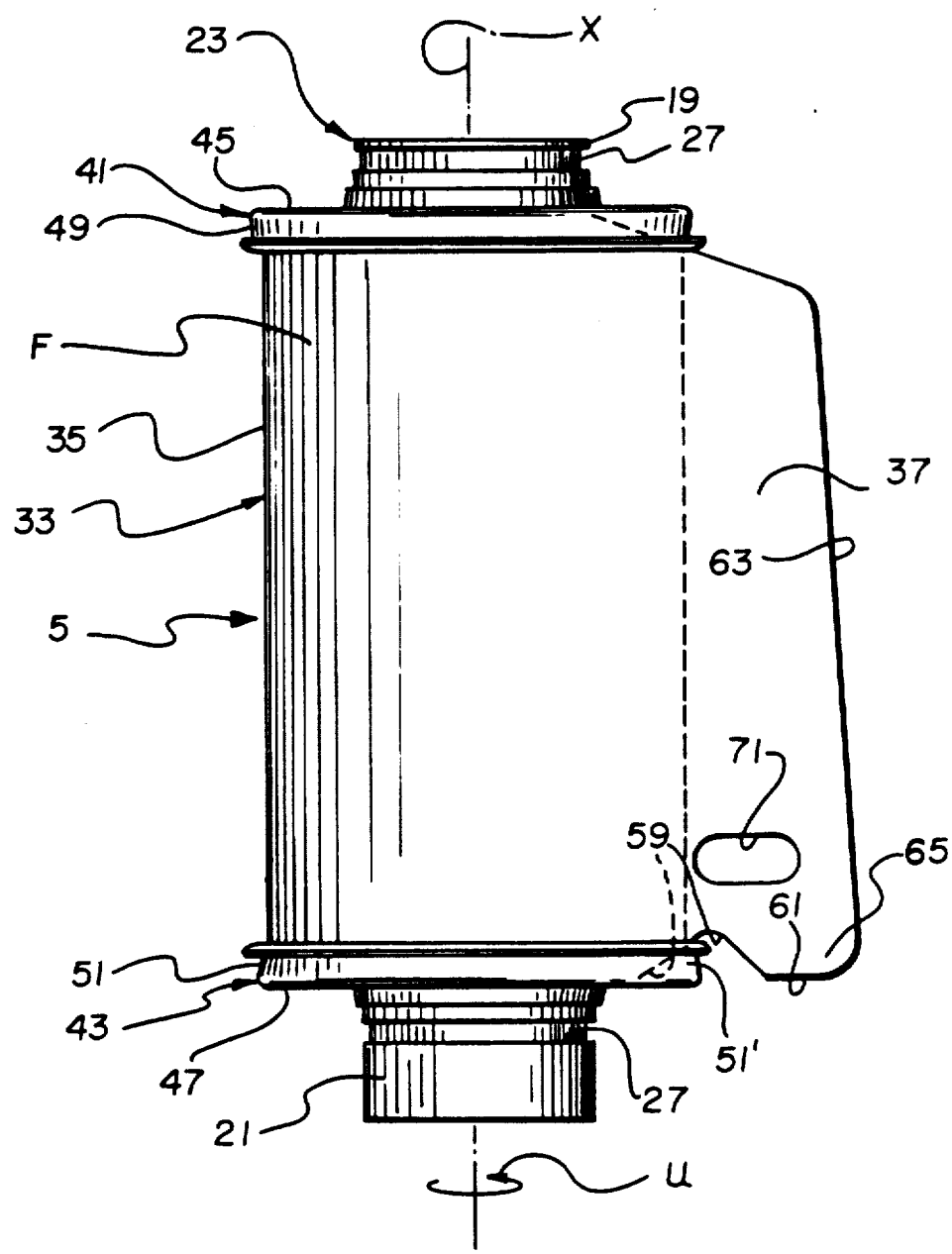
FIGS. 7 and 8 are elevation views similar to FIGS. 5 and 6, illustrating the manner in which the film roll is unwound from the film spool.

A slot 71 is cut in the outermost convolution (film leader) 35 substantially proximate its leading end 37. A tooth 73 fixed to the interior wall 57 of the cassette shell 3 has a free pointed end 75 which is positioned to be received in the slot 71 to thus engage the outermost convolution (film leader) 35, when the film spool 5 is rotated in the winding direction W as shown in FIG. 4, and to exit the slot to thus disengage that convolution, when the film spool is rotated in the unwinding direction U as shown in FIG. 3. The engagement of the outermost convolution 35 and the tooth 73 responsive to rotation of the film spool in the winding direction W prevents the leading end 37 of that convolution from coming to rest between the stripper-guide 67 and the next-inward convolution 39.

When the spool core 23 is initially rotated in the unwinding direction U, the two flanges 41 and 43 momentarily may remain stationary and the film roll 33, since its inner end is attached to the spool core, tends to expand radially or clock-spring to ensure a firm non-slipping relation between the outermost convolution (film leader) 35 of the film roll and the annular lips 49 and 51 of the flanges. Then, further rotation of the spool core 23 will similarly rotate the flanges 41 and 43. As a result, the leading end 37 of the outermost convolution (film leader) 35 will be advanced over the stripper-guide 67, causing successive arcuate portions of the flanges 41 and 43 to be flexed axially away from one another as shown in FIG. 8. This first allows the notch 59 to separate from the lip section 51', and then it allows successive longitudinal sections of the film roll 33 (beginning with the leading end 37) to exit from between the flanges to the outside of the cassette shell 3.

If the film spool 5 is rotated in the winding direction W before the entire length of the filmstrip F has been exposed, for example in a photographic camera, and it is desired to subsequently use the remaining available portion of the filmstrip at a later time, the film spool is rotated substantially until the slot 71 receives the free end 75 of the tooth 73 to thus engage the outermost convolution 35 (film leader) to the tooth. Thereafter, to use the remaining available portion of the filmstrip F, for example in a photographic camera, the film spool 5 is rotated in the unwinding direction U to disengage the outermost convolution (film leader) 35 from the tooth 73 and to re-advance the filmstrip to the outside of the cassette shell 3.

The Film-Exposure Status Indicator Of The Film Cassette

Figure 9:
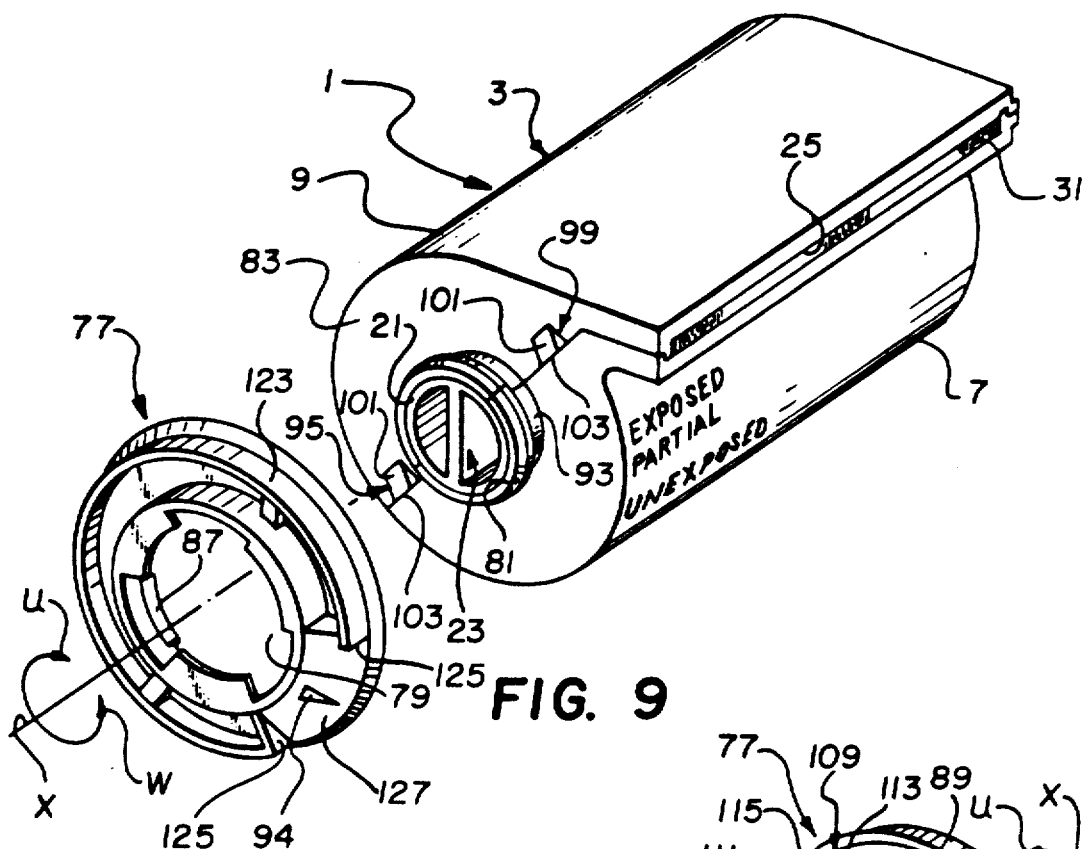
FIGS. 9 and 10 are exploded perspective views of the cassette shell and the film-exposure status indicator.
Figure 10:
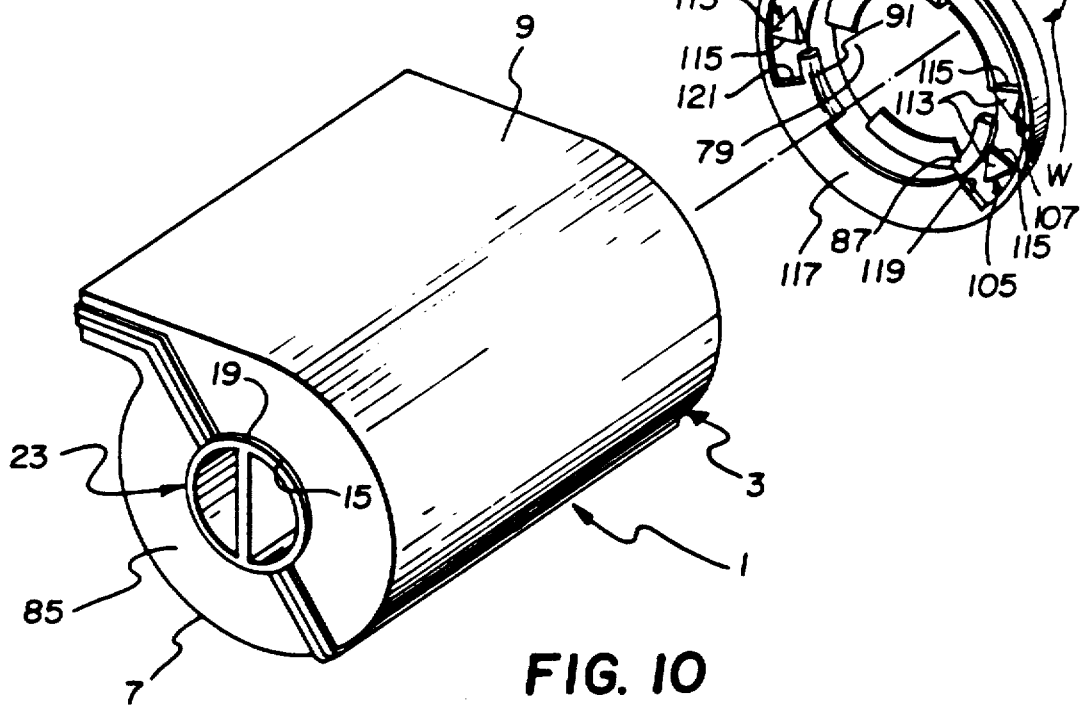

FIGS. 9 and 10 depict a ring-shaped film-exposure status indicator 77 having a central aperture 79 into which projects a neck-like extension 81 of one of two opposite exterior ends 83 and 85 of the cassette shell 3. The indicator 77 has three evenly spaced, radially inward tabs 87, 89, and 91 that fit into a peripheral annular groove 93 in the neck-like extension 81 to support the indicator for rotation about the axis X relative to the cassette shell 3 and the film spool 5.

Figure 11A:
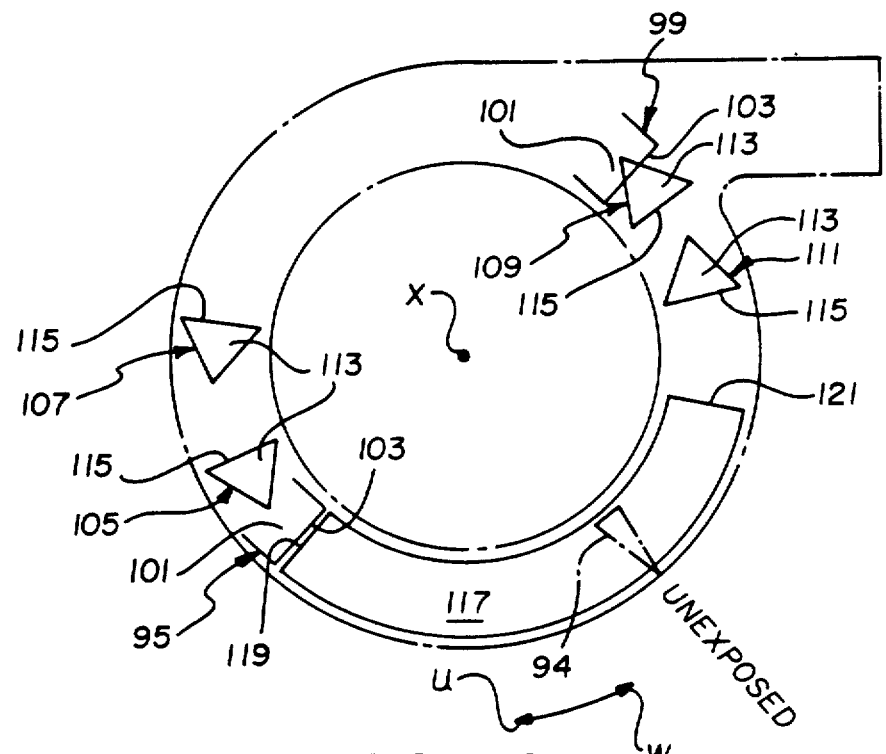
FIGS. 11A and 11B are schematic views depicting the status indicator in a normal first or unexposed position to indicate the film roll is generally unexposed.
Figure 12A:
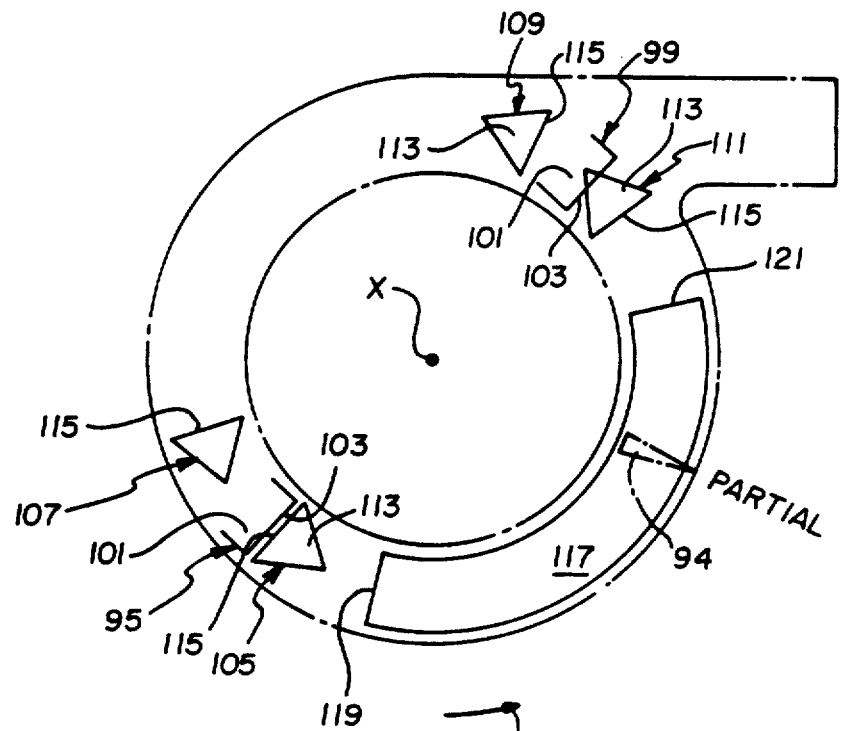
FIGS. 12A and 12B are schematic views depicting the status indicator in a second or partly exposed position to indicate the film roll is only partly exposed.
Figure 13A:
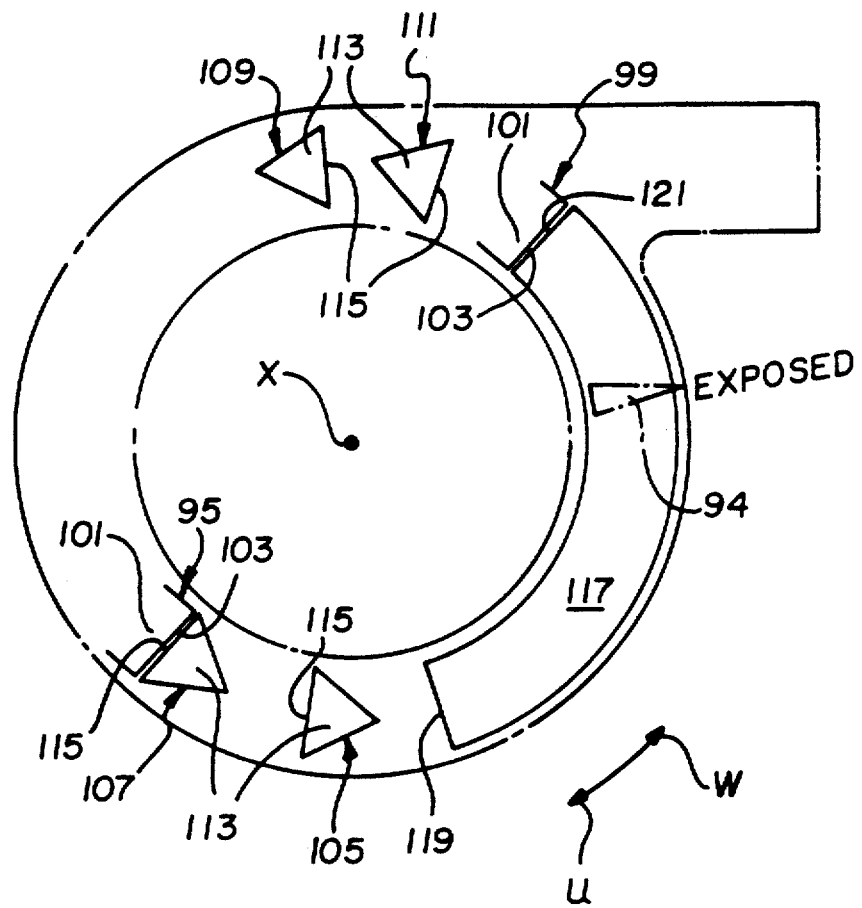
FIGS. 13A and 13B are schematic views depicting the status indicator in a third or exposed position to indicate the film roll is substantially completely exposed.
Figure 14:
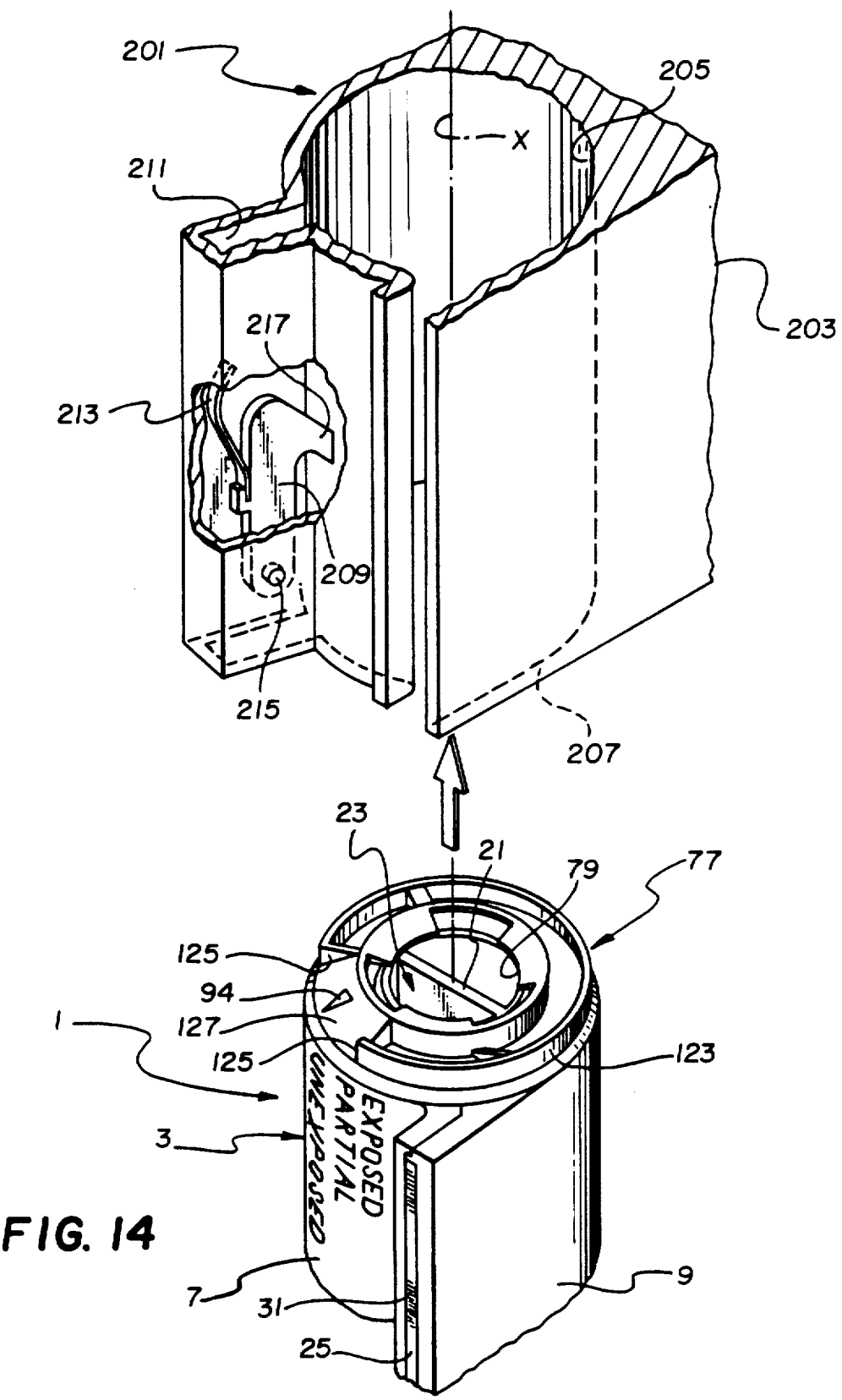
FIG. 14 is a perspective view of camera apparatus including a sensing/blocking member that cooperates with the status indicator of the film cassette to prevent loading of the film cassette into a loading chamber when the status indicator is in its third or exposed position, according to a preferred embodiment of the invention.

The indicator 77 is intended to be rotated, for example in the winding direction W, from an original or normal first position, shown in FIGS. 11A and 14, to successive second and third positions, shown in FIGS. 12A and 13A, for providing respective visible indications that the filmstrip F stored in the cassette shell 3 is generally unexposed, the filmstrip has been returned to the inside of the shell before all of the film frames have been exposed, and the filmstrip is substantially completely exposed. To achieve these visible indications, a pointer 94 is formed on the indicator 77 for individual alignment with each of three successive imprints "UNEXPOSED", "PARTIAL", and "EXPOSED" printed on the outside of the cassette shell 3. See FIG. 9. When the indicator 77 is in its first or unexposed position, shown in FIGS. 11A and 15A, the pointer 94 points to the imprint "UNEXPOSED". When the indicator 77 is in its second or partly exposed position, shown in FIGS. 12A and 16A, the pointer 94 points to the imprint "PARTIAL". When the indicator 77 is in its third or exposed position, shown in FIGS. 13A and 17A, the pointer 94 points to the imprint "EXPOSED".

Figure 11B:
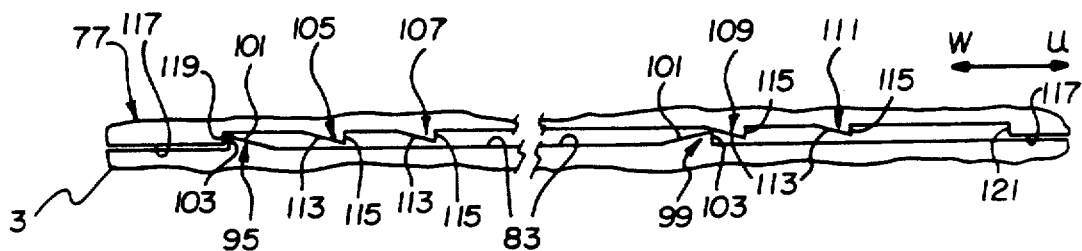
Figure 12B:
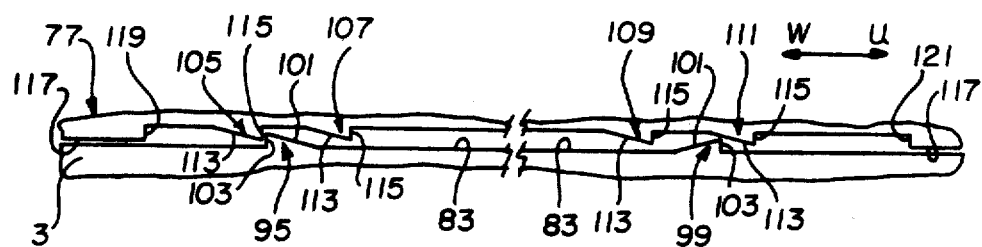
Figure 13B:
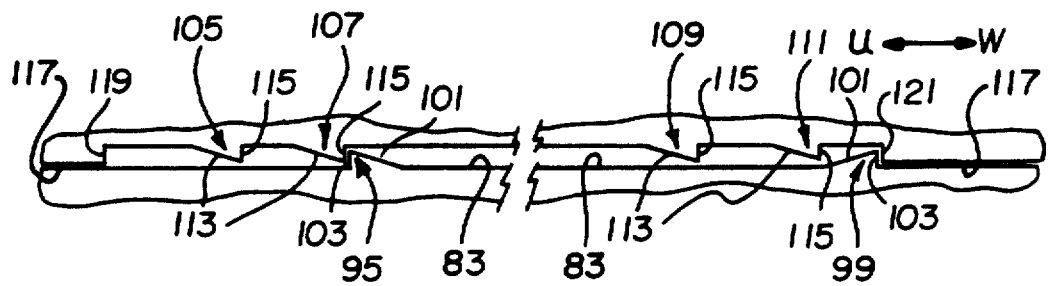

Cooperative engagement means are formed on the exterior end 83 of the cassette shell 3 and the underside of the indicator 77 for limiting rotation of the indicator unidirectionally in the winding direction W from its first or unexposed position to its second or partly exposed position and from the second position to its third or exposed position, and for preventing rotation of the indicator out of the third position. Specifically, the engagement means formed on the exterior end 83 of the cassette shell 3 comprises a pair of identical ramps 95 and 99, each having an inclined surface 101 and a cliff surface 103, and being radially in-line and equally spaced from the axis X. See FIGS. 9, 11A, and 11B. The engagement means formed on the underside of the indicator 77 comprises four identical ramps 105, 107, 109, and 111, each having an inclined surface 113 and a cliff surface 115, and each being equally spaced from the axis X, and a single flat 117 having two identical cliff surfaces 119 and 121 similarly spaced from the axis X. See FIGS. 10, 11A and 11B. When the indicator is in its first or unexposed position, shown in FIGS. 11A and 11B, the cliff surface 103 of the ramp 95 is located adjacent the cliff surface 119 of the flat 117, to absolutely prevent rotation of the indicator in the unwinding direction U, and the cliff surface 103 of the ramp 99 is located opposite the inclined surface 113 of the ramp 109, to lightly restrain the indicator from being rotated in the winding direction W. Thus, the indicator 77 is secured in the first or unexposed position, but can be moved to the second or partly exposed position. If the indicator 77 is then rotated in the winding direction W, the inclined surface 113 of the ramp 109 will move over the cliff surface 103 of the ramp 99. When the indicator 77 is in its second or partly exposed position, shown in FIGS. 12A and 12B, the cliff surface 103 of the ramp 95 is located adjacent the cliff surface 115 of the ramp 105, to absolutely prevent rotation of the indicator in the unwinding direction U, and the cliff surface 103 of the ramp 99 is located opposite the inclined surface 113 of the ramp 111, to lightly restrain the indicator from being rotated in the winding direction W. Thus, the indicator 77 is secured in the second or partly exposed position, but can be moved to the third or exposed position. If the indicator 77 is then rotated in the winding direction W, the inclined surface 113 of the ramp 111 will move over the cliff surface 103 of the ramp 99. When the indicator 77 is in its third or exposed position, shown in FIGS. 13A and 13B, the cliff surface 103 of the ramp 95 is located adjacent the cliff surface 115 of the ramp 107, to absolutely prevent rotation of the indicator in the unwinding direction U, and the cliff surface 103 of the ramp 99 is located adjacent the cliff surface 121 of the flat 117, to absolutely prevent rotation of the indicator in the winding direction. Thus, the indicator 77 cannot be moved out of the third or exposed position.

As shown in FIGS. 9 and 14, the indicator 77 includes an upstanding annular lip 123 concentrically arranged about the axis X. A gap or opening 125 in the annular lip 123 defines the longitudinal limits of a discontinuity with respect to the lip, comprising a beveled (inclined) surface 127 of the indicator 77. When the indicator 77 is in its first or unexposed position, the beveled surface 127 occupies a first area indicated by the arrow-line 129 in FIG. 15A. Conversely, when the indicator 77 is in its second or partly exposed position, the beveled surface 127 occupies a second area indicated by the arrow-line 131 in FIG. 16A. As depicted in FIG. 16A, the first area 129 and the second area 131 share the same space or are partly in-common to effect an in-common portion of the two areas indicated by the arrow-line 133, and to effect a particular portion of the first area indicated by the arrow-line 135 which is not in-common with the second area. When the indicator 77 is in its third or exposed position, the beveled surface 127 occupies a third area indicated by the arrow-line 137 in FIG. 17A. The significance of the in-common portion 133 of the first and second areas 129 and 131, the non in-common portion 135 of the first area, and the the third area 137 will become apparent from the description of camera apparatus which follows.

Camera Apparatus - Preferred

Camera apparatus 201 is shown in FIG. 14 for use with the film cassette 1 having the film-exposure status indicator 77. The camera apparatus 201 includes a camera body 203 having a loading chamber 205 with an entry opening 207 for receiving the film cassette 1 longitudinally or axially (endwise) into the chamber. A sensing member 209 located within a slot 211 opening into the loading chamber 205 is urged by a leaf spring 213 to pivot clockwise in FIG. 14 about a support pin 215 until a hook-like end 217 of the sensing member protrudes into the loading chamber 205. In this normal position, the sensing member 209 is disposed to locate its hook-like end 217 for abutment with the indicator 77 of the film cassette 1 when the cassette is inserted lengthwise into the loading chamber 205.

Figure 15A:
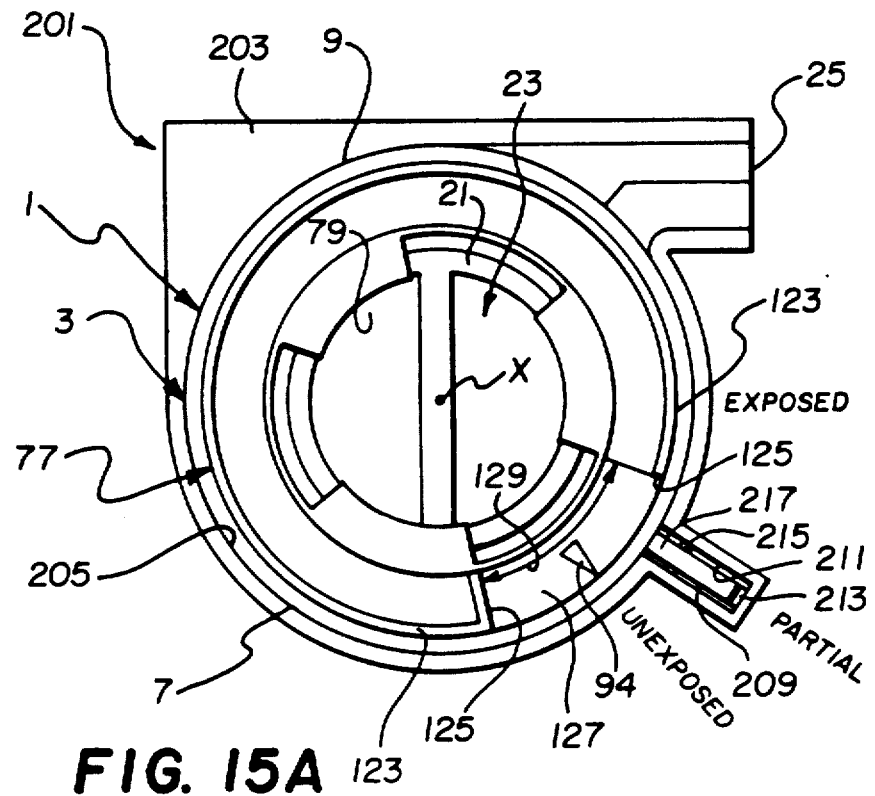
FIGS. 15A and 15B are schematic views depicting interaction of the sensing/blocking member and the status indicator when the status indicator is in its first or unexposed position.
Figure 15B:
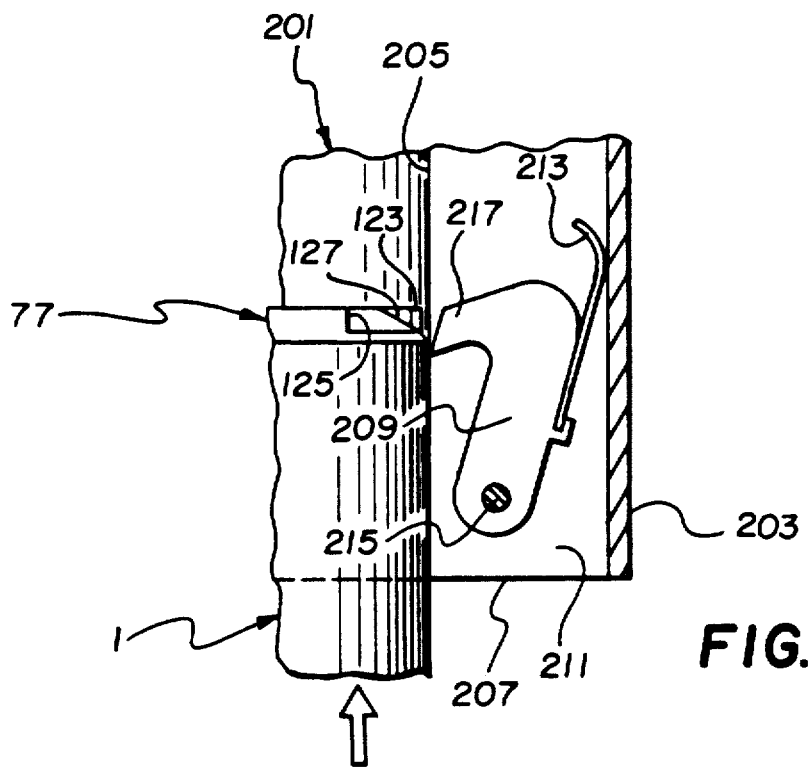
Figure 16A:
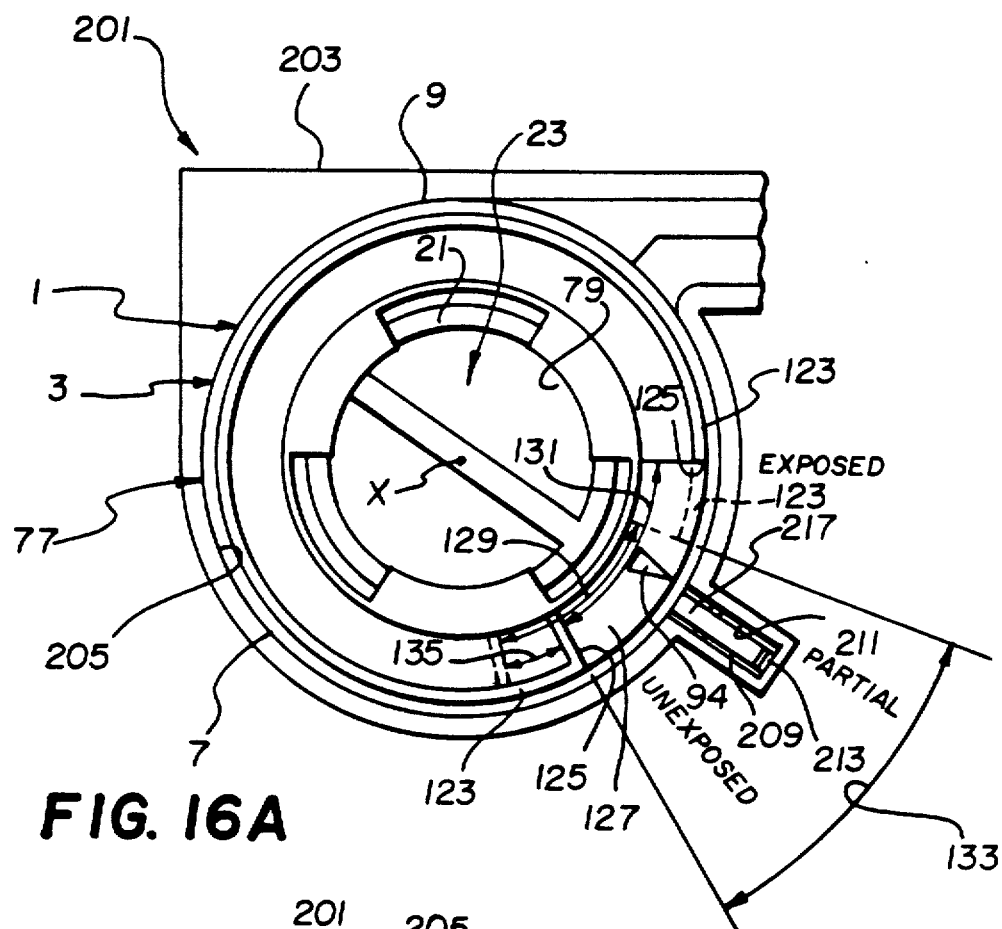
FIGS. 16A and 16B are schematic views depicting interaction of the sensing/blocking member and the status indicator when the status indicator is in its second or partly exposed position.
Figure 16B:
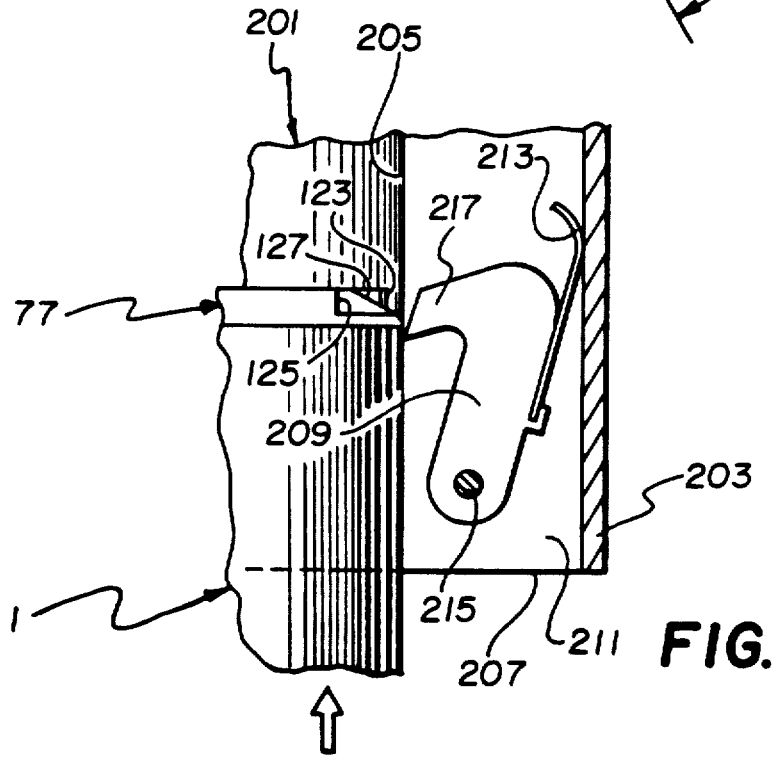
Figure 17A:
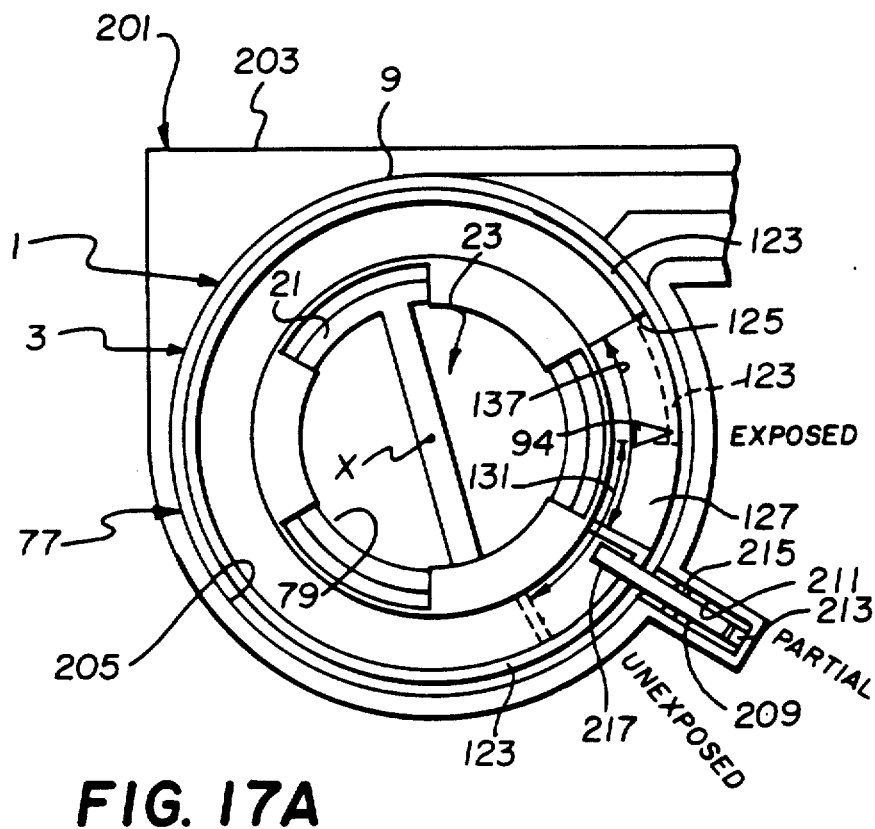
FIGS. 17A and 17B are schematic views depicting interaction of the sensing/blocking member and the status indicator when the status indicator is in its third or exposed position.
Figure 17B:
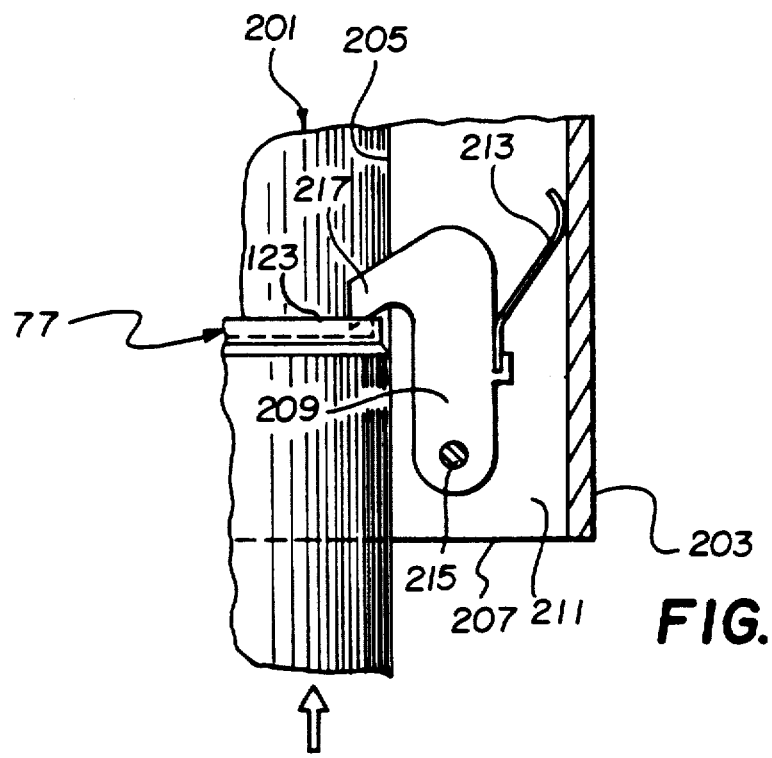

As shown in FIGS. 15A and 15B, when the indicator 77 is in the unexposed position and the film cassette 1 is first inserted lengthwise into the loading chamber 205, the beveled surface 127 of the indicator contacts the hook-like end 217 of the sensing member 209 to cam or pivot the sensing member out of the way of the indicator to allow the cassette to be further inserted into the loading chamber. The same occurs as shown in FIGS. 16A and 16B, when the indicator 77 is in the partly exposed position. However, as shown in FIGS. 17A and 17B, when the indicator 77 is in the exposed position and the film cassette 1 is first inserted lengthwise into the loading chamber 205, the annular lip 123 (rather than the beveled surface 127) of the indicator 77 contacts the hook-like end 217 of the sensing member 209, causing the annular lip to be caught by the hook-like end to thereby prevent further insertion of the cassette into the loading chamber.

The significance of the in-common portion 133 of the first and second areas 129 and 131 occupied by the beveled surface 127 of the indicator 77 in FIGS. 15A and 16A can now be appreciated. That is, with the camera apparatus 201, the beveled surface 127 can be identically sensed at the same location (within the in-common portion 133) by the hook-like end 217 of the sensing member 205 regardless of whether the indicator 77 is in the unexposed position as in FIG. 15A or is in the partly exposed position as in FIG. 16A. Also, the significance of the third area 137 occupied by the beveled surface 127 in FIG. 17A can now be appreciated. That is, with the camera apparatus 201, the beveled surface 127 cannot be sensed by the hook-like end 217 of the sensing member 205 when the indicator 77 is in the exposed position as in FIG. 17A because the third area 137 does not extend to the hook-like end. As a result, the annular lip 123 of the indicator 77 will be caught by the hook-like end. See FIG. 17B.

Cross-referenced application Ser. No. 390,931 discloses drive means which may be included in the camera apparatus 201 to move the indicator 77 from the unexposed position to the partly exposed position in the event the filmstrip F is returned to the cassette shell 3 partly exposed. Also, the drive means can move the indicator 77 from either the unexposed or partly exposed position to the exposed position in the event the filmstrip F returned to the cassette shell 3 is substantially completely exposed.

Camera Apparatus - Alternate

Figure 18:
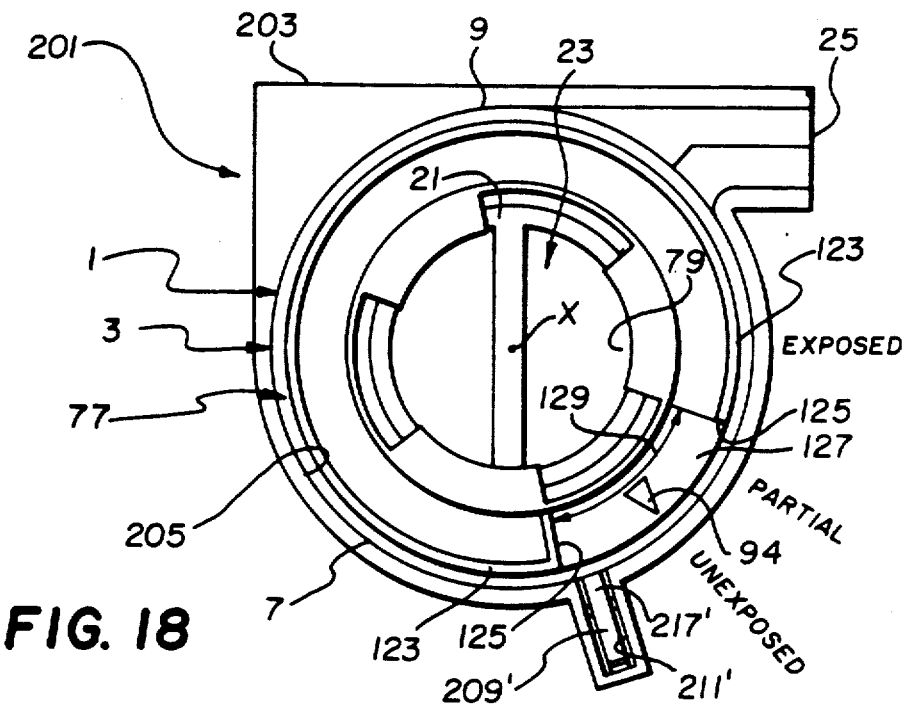
FIGS. 18, 19 and 20 are schematic views depicting interaction of the sensing/blocking member and the status indicator when the status indicator is in its unexposed, partly exposed, and exposed positions, respectively, according to an alternate embodiment of the invention.
Figure 19:
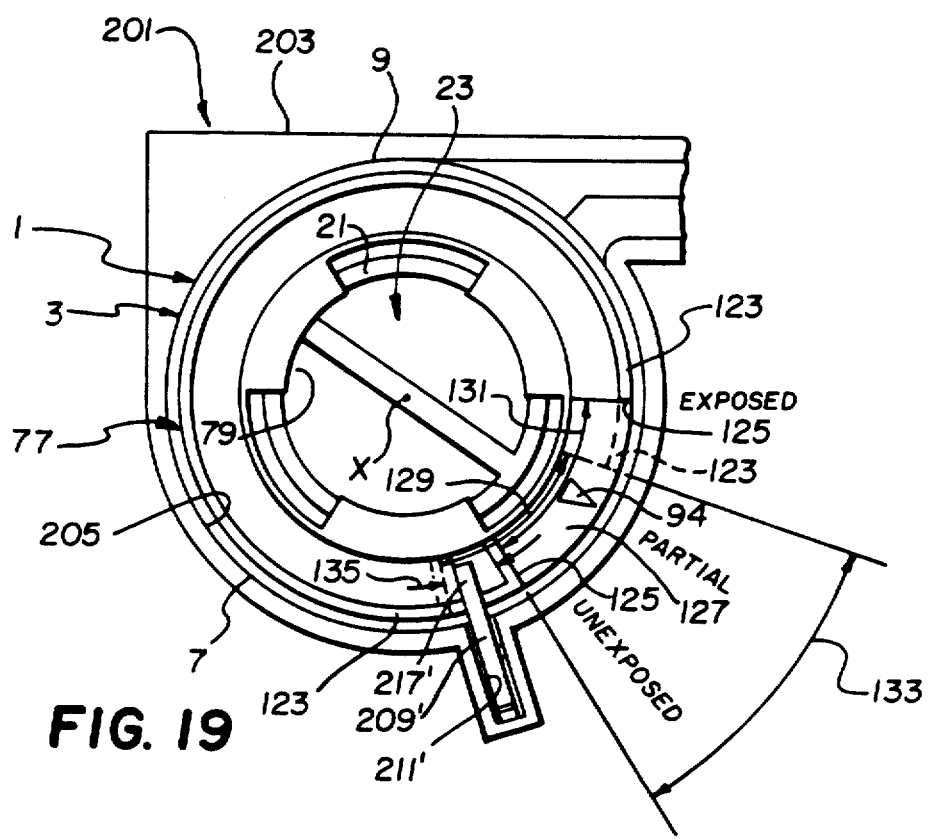
Figure 20:
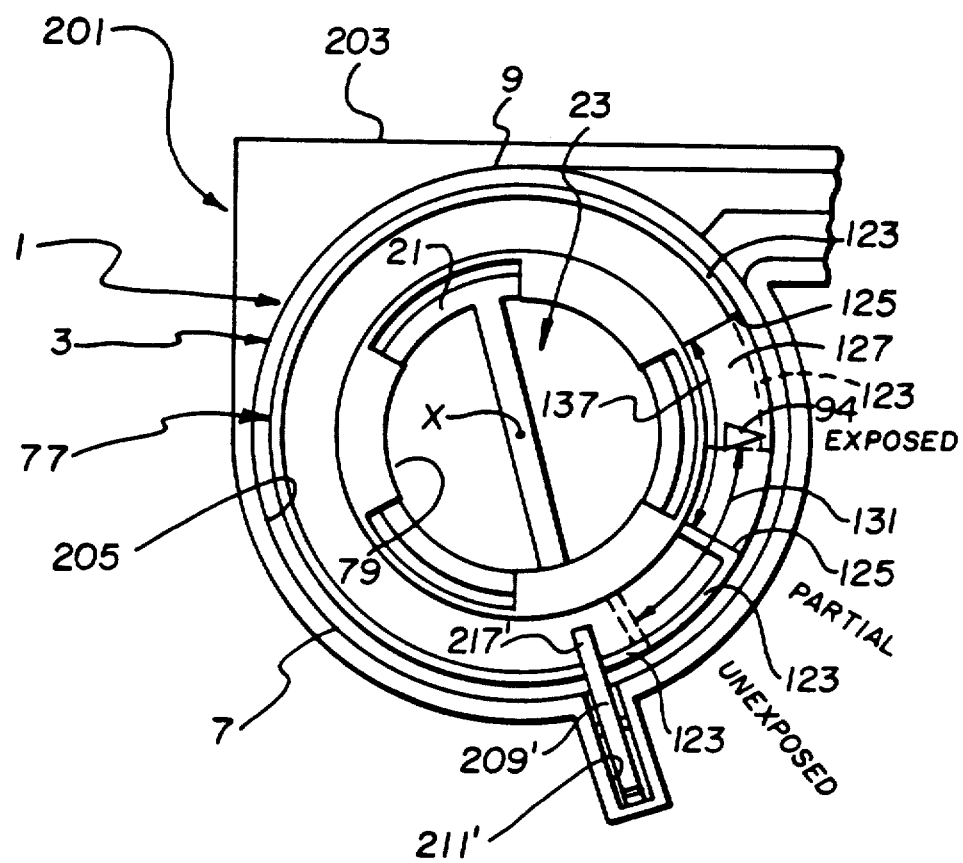

FIGS. 18, 19 and 20 illustrate a slightly modified version of the camera apparatus 201. The modification concerns the location of the slot 211 and the sensing member 209 including its hook-like end 217 relative to the beveled surface 127 of the indicator 77. In FIGS. 18-20, the slot is indicated as 211', the sensing member is indicated as 209', and the hook-like end is indicated as 217'.

As can be appreciated from FIG. 18, when the indicator 77 is in the unexposed position and the film cassette 1 is first inserted lengthwise into the loading chamber 205, the beveled surface 127 of the indicator contacts the hook-like end 217' of the sensing member 209' to cam or pivot the sensing member out of the way of the indicator to allow the cassette to the further inserted in the loading chamber. However, as shown in FIGS. 19 and 20, when the indicator 77 is in the partly exposed or exposed position and the film cassette 1 is first inserted lengthwise into the loading chamber 205, the annular lip 123 (rather than the beveled surface 127) of the indicator 77 contacts the hook-like end 217' of the sensing member 209', causing the annular lip to be caught by the hook-like end to thereby prevent further insertion of the cassette into the loading chamber.

The significance of the non in-common portion 135 of the first area 129 occupied by the beveled surface 127 of the indicator in FIG. 18 can now be appreciated. That is, when comparing FIG. 18 with FIGS. 19 and 20, it will be seen that the beveled surface 127 can be sensed at one location (within the non in-common portion 135) by the hook-like end 217' of the sensing member 209' when the indicator is in the unexposed position as in FIG. 18. The beveled surface 127 cannot be sensed by the hook-like end 217' of the sensing member 209' when the indicator 77 is in the partly exposed position as in FIG. 19 or is in the exposed position as in FIG. 20.

Cross-referenced application Ser. No. 407,170 discloses drive means which may be included to move the indicator 77 from the unexposed position to the exposed position without stopping at the partly exposed position.

The invention has been described with reference to preferred and alternate embodiments. However, it will be appreciated that variations and modifications can be effected with the ordinary skill in the art without departing from the scope of the invention. For example, the camera apparatus 201 could be used with a film cassette wherein the film-exposure status indicator has only two positions, one for unexposed film and the other for at least partly exposed film.

I claim:

1. A device to be used with a film cassette having a film-exposure status indicator movable from an unexposed position for providing a visible indication that a filmstrip within the cassette is unexposed, to a partly exposed position for providing a visible indication that the filmstrip is only partly exposed, and to an exposed position for providing a visible indication that exposure of the filmstrip is completed, wherein said device is characterized in that:

a loading chamber is configured to receive the film cassette; and sensing means is adapted to cooperate with the status indicator of the cassette for preventing the cassette from being inserted into said loading chamber when the status indicator is in its exposed position.

2. A device as recited in claim 1, wherein said sensing means includes integral means that cooperate with the status indicator of the film cassette for allowing the cassette to be inserted into said loading chamber when the status indicator is in either one of its unexposed or partly exposed positions to only prevent the cassette from being inserted into the loading chamber when the status indicator is in its exposed position.

3. A device as recited in claim 1, wherein said sensing means includes integral means that cooperates with the status indicator of the cassette for preventing the cassette from being inserted into said loading chamber when the status indicator is in either one of its exposed or partly exposed positions to allow the cassette only to be inserted in the loading chamber when the status indicator is in its unexposed position.

4. A device as recited in claim 1, herein said sensing means includes a sensing member normally positioned for abutment with the status indicator of the film cassette when the cassette is attempted to be inserted into said loading chamber, said sensing member supported to be moved by the status indicator out of the way of the status indicator to allow the cassette to be inserted into the loading chamber when the status indicator is in its unexposed position.

5. A device as recited in claim 1, wherein said sensing means includes a sensing member normally positioned for abutment with the status indicator of the film cassette when the cassette is attempted to be inserted into said loading chamber, said sensing member supported to be moved by the status indicator out of the way of the status indicator to allow the cassette to be inserted into the loading chamber when the status indicator is in either one of its unexposed or partly exposed positions but not to be moved out of the way of the status indicator to prevent insertion of the cassette into the loading chamber when the status indicator is in its exposed position.

6. A device as recited in claim 1, wherein said sensing means includes a sensing member normally positioned for abutment with the status indicator of the film cassette when the cassette is attempted to be inserted into said loading chamber, said sensing member supported to be moved by the status indicator out of the way of the status indicator to allow the cassette to be inserted into the loading chamber when the status indicator is in its unexposed position but not to be moved out of the way of the status indicator to prevent insertion of the cassette into the loading chamber when the status indicator is in either one of its exposed or partly exposed positions.

7. A device as recited in any one of claims 4, 5 or 6, wherein said loading chamber includes an entry opening for inserting the film cassette lengthwise into the loading chamber, and said sensing member normally protrudes into the loading chamber for abutment with the status indicator of the cassette when the cassette is attempted to be inserted lengthwise into the loading chamber.

8. A device as recited in claim 7, wherein said sensing member is spring-biased to normally protrude into said loading chamber and includes a hook-like end portion for catching the status indicator of the film cassette.

9. A device to be used with a film cassette having a film-exposure status indicator movable from an unexposed position for providing a visible indication that a filmstrip within the cassette is unexposed to an exposed position for providing a visible indication that exposure of the filmstrip is completed, wherein said is characterized in that:

a loading chamber is configured to receive the film cassette; and sensing means is adapted to cooperate with the status indicator of the cassette for preventing the cassette from being inserted into said loading chamber when the status indicator is in its exposed position.

10. A device as recited in claim 9, wherein said sensing means includes a sensing member normally positioned for abutment with the status indicator of the film cassette when the cassette is attempted to be inserted into said loading chamber, said sensing member supported to be moved by the status indicator out of the way of the status indicator to allow the cassette to be inserted into the loading chamber when the status indicator is in its unexposed position but not to be moved out of the way of the status indicator to prevent insertion of the cassette into the loading chamber when the status indicator is in its exposed position.

11. A device as recited in claim 10, wherein said loading chamber includes an entry opening for inserting the film cassette lengthwise into the loading chamber, and said sensing member normally protrudes into the loading chamber for abutment with the status indicator of the cassette when the cassette is attempted to be inserted lengthwise into the loading chamber.

12. A device as recited in claim 11, wherein said sensing member includes a hook-like end portion for catching the status indicator of the film cassette.

13. A device to be used with a film cassette having a film-exposure status indicator movable from an unexposed position for providing a visible indication that a filmstrip within the cassette is unexposed to some other position for providing a visible indication that the filmstrip is at least partly exposed, wherein said device is characterized in that:

a loading chamber is configured to receive the film cassette; and sensing means is adapted to cooperate with the status indicator of the cassette for preventing the cassette from being inserted into said loading chamber when the status indicator is in the other position.

14. A device as recited in claim 13, wherein said sensing means includes a sensing member normally positioned for abutment with the status indicator of the film cassette when the cassette is attempted to be inserted into said loading chamber, said sensing member supported to be moved by the status indicator out of the way of the status indicator to allow the cassette to be inserted into the loading chamber when the status indicator is in its unexposed position but not to be moved out of the way of the status indicator to prevent insertion of the cassette into the loading chamber when the status indicator is in its other position.

15. A device as recited in claim 14, wherein said loading chamber includes an entry opening for inserting the film cassette lengthwise into the loading chamber, and said sensing member normally protrudes into the loading chamber for abutment with the status indicator of the cassette when the cassette is attempted to be inserted lengthwise into the loading chamber.

16. A device as recited in claim 15, wherein said sensing member includes a hook-like end portion for catching the status indicator of the film cassette.

* * * * *